United States Patent [19]

Grover et al.

[11] Patent Number: 4,484,469

[45] Date of Patent: Nov. 27, 1984

[54] LUMINOSITY PROBE WITH POSITIVELY RETAINED LIGHT PIPE

[75] Inventors: Donald D. Grover, Kenosha, Wis.; Ralph H. Mueller, Auburn, N.Y.

[73] Assignee: Snap-on Tools Corporation, Kenosha, Wis.

[21] Appl. No.: 492,628

[22] Filed: May 9, 1983

[51] Int. Cl.$^3$ .............................................. G01M 15/00

[52] U.S. Cl. .................................... 73/119 A; 73/117.3

[58] Field of Search .................... 73/117.3, 35, 119 A; 138/141; 250/227, 554

[56] References Cited

U.S. PATENT DOCUMENTS 4,337,648 7/1982 Gillespie ........................ 73/119 A X 4,409,815 10/1983 Burkel et al. ........................... 73/35

*Primary Examiner*—Jerry W. Myracle

*Attorney, Agent, or Firm*—Emrich & Dithmar

[57] ABSTRACT

The luminosity probe includes an elongated tubular member having a bore extending therethrough. Within the bore is a light pipe having a diameter less than the diameter of the bore so as to create an annulus therebetween. Such annulus is filled with epoxy.

7 Claims, 8 Drawing Figures

LUMINOSITY PROBE WITH POSITIVELY RETAINED LIGHT PIPE

BACKGROUND OF THE INVENTION

This invention relates to a luminosity probe for diesel-engine timing apparatus, and more particularly to a luminosity probe adapted to be mounted in a selected cylinder of a diesel engine.

The probe responds to the occurrence of combustion events in the cylinder by converting light into electrical signals which thereafter are processed in the timing apparatus. Additional details of timing apparatus incorporating such luminosity probe can be obtained by reference to U.S. Pat. No. 4,373,384, assigned to the assignee of this application.

A prior art luminosity probe is disclosed in appplication Ser. No. 285,942, filed July 23, 1981, now U.S. Pat. No. 4,441,021, assigned to the assignee of this application. The luminosity probe disclosed therein includes a tubular member having a portion adapted to be inserted in the opening of a selected cylinder of a diesel engine so as to be exposed to light occurring therein. The member has a portion that projects outside the cylinder. A light pipe is located in the member to transmit light therethrough. A coupler is telescoped with the projecting portion of the tubular member and houses a photodetector which converts the light traveling through the light pipe into electrical signals.

The light pipe is retained in the tubular member by epoxy or other binder. The light pipe being glass tends to have a very smooth surface. Certain luminosity probes are limited in the length of the bond line between the light pipe and the binder. As a result, the bond line may be inadequate, so that the light pipe can become dislodged from its optimal position.

SUMMARY OF THE INVENTION

It is, therefore, an important object of the present invention to provide a luminosity probe in which the light pipe is positively retained in position so that even if the bond fails, it will not move from its optimal position.

In summary, there is provided a luminosity probe for diesel-engine timing apparatus comprising an elongated tubular member adapted to be mounted in the opening of a selected engine cylinder and having a tip projecting into the combustion zone thereof to be subjected to light occurring therein, the tubular member having a portion projecting outside the cylinder, the tubular member having a bore therein, a light pipe in the bore having an outside diameter less than the inside diameter of the bore so as to create an annulus therebetween, the light pipe having a retaining portion of diameter different than substantially the rest of the light pipe, binder means in the annulus, a coupler telescopically engaging the projecting portion, and a photodetector within the coupler in effective relation with the adjacent end of the light pipe for converting light passing through the light pipe into electrical signals.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
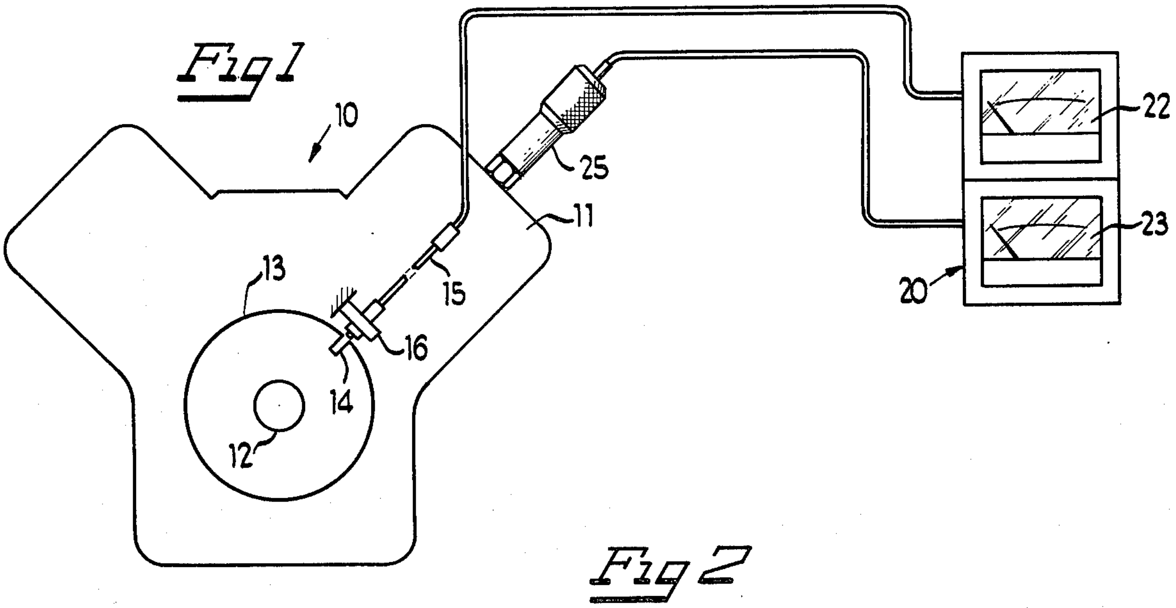
FIG. 1 schematically depicts the engine block of a diesel engine and diesel-engine timing apparatus which includes a luminosity probe incorporating the features of the present invention.

Turning now to the drawings and more particularly to FIG. 1 thereof, there is depicted a diesel engine 10 having a plurality of cylinders, one of which is labeled with the reference numeral 11. Each cylinder in the engine has an associated prechamber which in turn has a threaded opening to accommodate a glow plug. For timing purposes, the glow plug for a selected cylinder is removed and is replaced by a luminosity probe 25 to be described in further detail hereinafter.

Crankshaft 12 of the engine 10, or a shaft driven by the crankshaft, carries a rotating engine part 13, such as a harmonic balancer, the latter having a peripheral notch 14 or other marking means such as a projection or embedded magnet. A magnetic probe 15 is detachably mounted in a fixed receptacle 16 so as to be in effective relation with the notch 14. The receptacle 16 is so located with respect to the engine block that the notch 14 passes the probe 15 a known number of degrees of crankshaft rotation after the piston in the number one cylinder has reached its top-dead-center position. The probe 15 generates a magnetic signal each time the notch 14 passes.

The probes 15 and 25 are coupled to a housing 20 which carries a display 22 on which appears the speed of the engine in rpm. A second display 23 in the housing 20 displays the amount of timing angle in degrees. The timing angle represents the number of degrees between each top-dead-center event and each magnetic signal.

Figure 2:
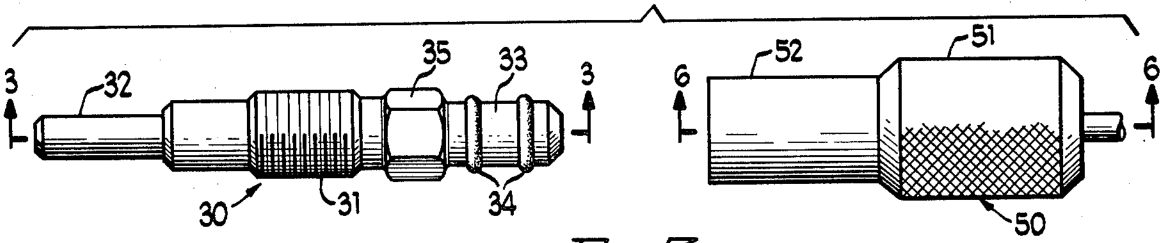
FIG. 2 is a view on an enlarged scale of the luminosity probe separated into its tubular member and its coupler.

Referring to FIG. 2, certain details of the luminosity probe 25 will be described. The probe 25 comprises an elongated tubular member 30 adapted to be mounted in the opening of the selected cylinder 11. The member 30 has a central body 31 which is threaded so as to be threadable into the opening of the selected cylinder. The body 31 carries a forwardly projecting tip 32 and a rearwardly directed portion 33. Two O-rings 34 are located in grooves on the projecting portion 33. The body 31 carries a wrench-engaging surface 35 disposed between the threads and the projecting portion 33.

Figure 3:
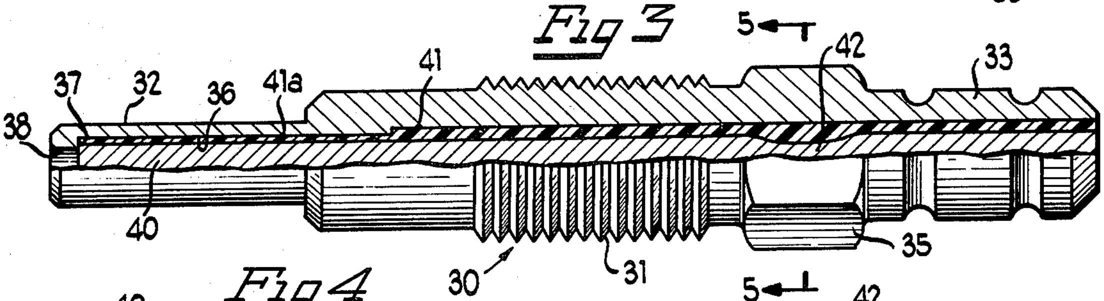
FIG. 3 is an enlarged view of the tubular member in cross section, taken along the line 3—3 of FIG. 2.

Referring to FIG. 3, the member 30 has a bore 36 extending axially therethrough. Although not required, in the embodiment depicted, the bore 36 extends substantially the entire length of the member 30. The front end of the bore 36 terminates at a shoulder 37. The tip of the member 30 has an aperture 38 of reduced diameter. Disposed within the bore 36 is a light pipe 40 extending from the shoulder 37. Although not required, in the particular embodiment depicted, the light pipe 40 is of substantially the same length as the member 30 extending to the rearend of the projecting portion 33.

The light pipe 40 may be composed of fused silica. It has an outside diameter less than the diameter of the bore 36, thereby creating an annulus or space therebetween. Most of the annulus in the central body 31 and all the annulus in the projecting portion 33 is preferably filled with a rigid adhesive such as epoxy. Epoxy has good strength in the presence of high temperature, and provides excellent sealing of combustion gases. The annulus in the region of the tip 32 is, of course, exposed to the high engine temperature. Adhesive 41*a* therein is preferably flexible so as to accommodate thermal expansion of the light pipe 40 caused by the hot engine. Even though the high engine temperature may cause the adhesive to burn out, a flexible residue which provides a seal against entry of soot remains.

High pressure from combustion in the cylinder causes axial force on the end of the light pipe 40, which tends to force it rearwardly against the holding force of the adhesive bond between the light pipe 40 and the binders 41 and 41*a*.

Figure 4:
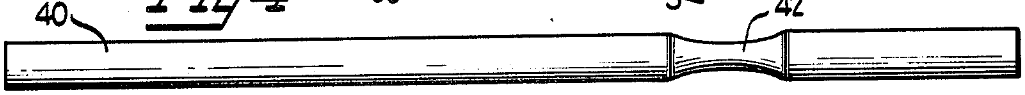
FIG. 4 is an elevational view of the light pipe in the tubular member of FIG. 2.
Figure 5:
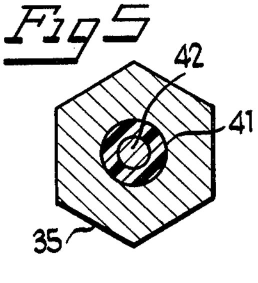
FIG. 5 is a view in vertical cross section taken along the line 5—5 of FIG. 4.
Figure 6:
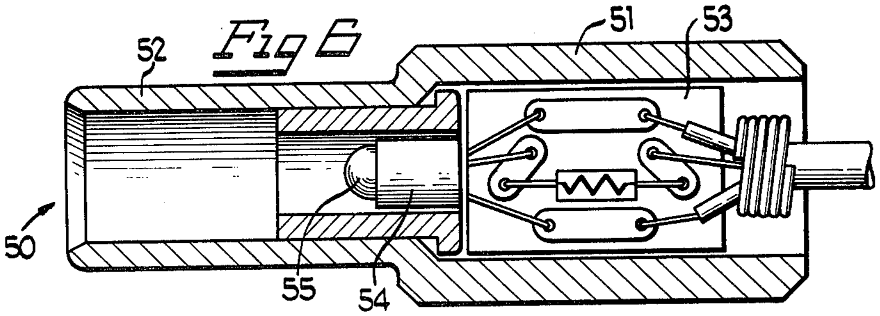
FIG. 6 is an enlarged view in vertical section taken along the line 6—6 of FIG. 2.

To prevent that, a short portion 42 of the light pipe 40 has a reduced diameter (see FIG. 4). The increased thickness of the annulus in that region is also filled with the binder 41. Then, if the bond line between the light pipe 40 and the binder 41 fails, the light pipe 40 is less likely to shift. That part of the binder 41 aligned with the reduced diameter portion 42 defines abutments to effectively block movement of the light pipe 40.

The wall of the bore 36 is rough compared to the surface of the light pipe 40, and the adhesive binder 41 adheres well to the metallic surface of the bore wall. Therefore, the bond line between the binders 41 and 41*a* and such wall is unlikely to fail.

The probe 25 further comprises a coupler 50 which includes a tubular housing 51 and a reduced-diameter tubular element 52. Within the housing 51 is a printed circuit board 53 carrying electrical components such as resistors and the like. A photodetector 54 is mounted in the housing 51 but protrudes slightly into the tubular element 52. A lens 55 focuses light onto the photodetector 54. The photodetector 54 converts light applied thereto into electrical signals. The inside diameter of the element 52 is slightly less than the outside diameter of the O-rings 34 on the projecting portion 33 in the embodiment shown.

When the member 30 is threaded into the glow plug opening, the tip 32 projects into the combustion zone. The coupler 50 is then telescopically engaged with the projecting portion 33, the deformation of the O-rings providing a frictional fit between the tubular member 30 and the coupler 50. Light during combustion is transmitted through the light pipe 40 to the photodetector 54.

While there is depicted in the drawings a member 30 having a male projecting portion 33 and a female coupler 50, the member 30 could be the female element and the coupler 50, the male element.

Figure 7:
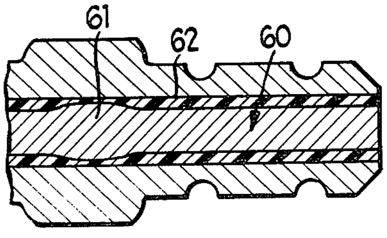
FIG. 7 is a fragmentary, sectional view of the tubular member depicting a second embodiment of the present invention.

An alternative embodiment is depicted in FIG. 7. The light pipe 60 has a portion 61 of increased diameter, thereby reducing the thickness of that part of the binder 62 in the region of such portion. If the bond line between the light pipe 60 and the binder 41 fails, the light pipe 60 cannot become dislodged because the hardened binder 62 provides abutments in both directions for the enlarged portion 61.

Figure 8:
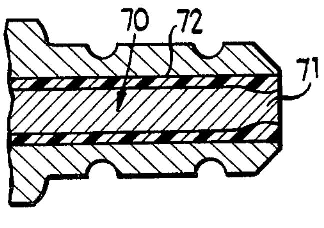
FIG. 8 is a fragmentary, sectional view of the tubular member showing another embodiment of the present invention.

A third embodiment is depicted in FIG. 8. The light pipe 70 has its rear end 71 of reduced diameter instead of a different diameter portion within the light pipe. That part of the binder 72 in the region of the end 71 is thereby enlarged. The hardened binder 72 provides an abutment for the end 71 to prevent the light pipe 70 from being dislodged.

In all three embodiments, the reduced or enlarged diameter portion in the light pipe is formed by stretching or compressing the light pipe. In that manner, there are no abrupt changes in diameter in the region of the reduced or increased diameter portion. Without abrupt changes, the path of light through the light pipe is not adversely affected. Abrupt changes, that is, more nearly radial surfaces, would affect the light path.

What has been described, therefore, is an improved luminosity probe having a light pipe therein in which means are provided to secure the light pipe in place during use.

We claim:

1. A luminosity probe for diesel-engine timing apparatus comprising an elongated tubular member adapted to be mounted in the opening of a selected engine cylinder and having a tip projecting into the combustion zone thereof to be subjected to light occurring therein, said tubular member having a portion projecting outside the cylinder, said tubular member having a bore therein, a light pipe in the bore having an outside diameter less than the inside diameter of the bore so as to create an annulus therebetween, said light pipe having a retaining portion of diameter different than substantially the rest of said light pipe, binder means in said annulus, a coupler telescopically engaging said projecting portion, and a photodetector within said coupler in effective relation with the adjacent end of said light pipe for converting light passing through said light pipe into electrical signals.

2. The luminosity probe of claim 1, wherein said light pipe has a substantially constant diameter for the entire length thereof except for said retaining portion which has a smaller diameter.

3. The luminosity probe of claim 1, wherein said light pipe has a substantially constant diameter for the entire length thereof except for said retaining portion which has a larger diameter.

4. The luminosity probe of claim 1, wherein said light pipe has only one retaining portion.

5. The luminosity probe of claim 1, wherein said light pipe has no abrupt changes in diameter in the region of said retaining portion.

6. The luminosity probe of claim 1, wherein said projecting portion is a male element and said coupler is a female element.

7. The luminosity probe of claim 1, wherein said retaining portion is at one end of said light pipe.

* * * * *